(12) United States Patent
Asakawa

(10) Patent No.: US 11,274,260 B2
(45) Date of Patent: *Mar. 15, 2022

(54) SLIDE MEMBER, BICYCLE COMPONENT USING SLIDE MEMBER, AND FISHING TACKLE COMPONENT USING SLIDE MEMBER

(71) Applicant: Shimano Inc., Osaka (JP)

(72) Inventor: Takamoto Asakawa, Osaka (JP)

(73) Assignee: Shimano Inc., Osaka (JP)

( * ) Notice: Subject to any disclaimer, the term of this patent is extended or adjusted under 35 U.S.C. 154(b) by 1065 days.

This patent is subject to a terminal disclaimer.

(21) Appl. No.: 14/335,114

(22) Filed: Jul. 18, 2014

(65) Prior Publication Data

US 2015/0093593 A1  Apr. 2, 2015

(30) Foreign Application Priority Data

Oct. 2, 2013 (JP) .............................. JP2013-207377
Oct. 2, 2013 (JP) .............................. JP2013-207378
Oct. 21, 2013 (JP) .............................. JP2013-218457

(51) Int. Cl.
*C10M 107/38* (2006.01)
*F16H 57/04* (2010.01)
(Continued)

(52) U.S. Cl.
CPC .......... *C10M 107/38* (2013.01); *A01K 87/04* (2013.01); *A01K 89/01* (2013.01);
(Continued)

(58) Field of Classification Search
CPC ....... Y10T 428/1266; Y10T 428/12667; Y10T 428/12778; Y10T 428/12792;
(Continued)

(56) References Cited

U.S. PATENT DOCUMENTS 4,681,817 A    7/1987  Shinada
5,356,545 A *  10/1994 Wayte ................. C10M 169/04
                                                            508/138
(Continued)

FOREIGN PATENT DOCUMENTS

CN          101336310 A      12/2008
DE    10 2008 015 790 A1    10/2008
(Continued)

OTHER PUBLICATIONS

Machine Translation, Kenichiro et al., JP 03-068778, Mar. 1991.*
(Continued)

*Primary Examiner* — Michael E. La Villa
(74) *Attorney, Agent, or Firm* — Global IP Counselors, LLP

(57) ABSTRACT

A slide member is provided with a base material, a plated slide layer and an intermediate plated layer. The plated slide layer contains a solid lubricant. The intermediate plated layer is disposed between the base material and the plated slide layer, the intermediate plated layer increasing cohesion of the base material and the plated slide layer. The plated slide layer has a content of the solid lubricant in a range from 30 to 70 vol %, inclusive.

14 Claims, 14 Drawing Sheets

(51) Int. Cl.
| | |
|---|---|
| *B32B 15/00* | (2006.01) |
| *B32B 15/01* | (2006.01) |
| *C23C 28/00* | (2006.01) |
| *C23C 30/00* | (2006.01) |
| *C10M 107/00* | (2006.01) |
| *C23C 28/02* | (2006.01) |
| *F16H 55/32* | (2006.01) |
| *B62M 9/10* | (2006.01) |
| *A01K 89/015* | (2006.01) |
| *A01K 89/01* | (2006.01) |
| *A01K 87/04* | (2006.01) |
| *C25D 7/00* | (2006.01) |
| *C25D 5/10* | (2006.01) |
| *C25D 5/34* | (2006.01) |
| *C25D 5/48* | (2006.01) |
| *F16H 1/02* | (2006.01) |
| *F16H 7/06* | (2006.01) |
| *F16H 55/30* | (2006.01) |
| *F16H 55/06* | (2006.01) |
| *C10N 50/00* | (2006.01) |

(52) U.S. Cl.
CPC .......... *A01K 89/0189* (2015.05); *B32B 15/00* (2013.01); *B32B 15/01* (2013.01); *B62M 9/105* (2013.01); *C10M 107/00* (2013.01); *C23C 28/00* (2013.01); *C23C 28/02* (2013.01); *C23C 28/30* (2013.01); *C23C 28/324* (2013.01); *C23C 30/00* (2013.01); *C23C 30/005* (2013.01); *C25D 5/10* (2013.01); *C25D 5/34* (2013.01); *C25D 5/48* (2013.01); *C25D 7/00* (2013.01); *F16H 1/02* (2013.01); *F16H 7/06* (2013.01); *F16H 55/32* (2013.01); *F16H 57/041* (2013.01); *C10M 2201/061* (2013.01); *C10M 2201/066* (2013.01); *C10M 2213/06* (2013.01); *C10M 2213/062* (2013.01); *C10N 2050/14* (2020.05); *F16H 55/06* (2013.01); *F16H 55/30* (2013.01); *Y10T 428/1266* (2015.01); *Y10T 428/1275* (2015.01); *Y10T 428/1291* (2015.01); *Y10T 428/12569* (2015.01); *Y10T 428/12576* (2015.01); *Y10T 428/12667* (2015.01); *Y10T 428/12708* (2015.01); *Y10T 428/12715* (2015.01); *Y10T 428/12722* (2015.01); *Y10T 428/12736* (2015.01); *Y10T 428/12743* (2015.01); *Y10T 428/12757* (2015.01); *Y10T 428/12764* (2015.01); *Y10T 428/12778* (2015.01); *Y10T 428/12792* (2015.01); *Y10T 428/12799* (2015.01); *Y10T 428/12806* (2015.01); *Y10T 428/12903* (2015.01); *Y10T 428/12917* (2015.01); *Y10T 428/12924* (2015.01); *Y10T 428/12931* (2015.01); *Y10T 428/12937* (2015.01); *Y10T 428/12944* (2015.01); *Y10T 428/12951* (2015.01); *Y10T 428/12972* (2015.01); *Y10T 428/12979* (2015.01); *Y10T 428/12986* (2015.01); *Y10T 428/21* (2015.01); *Y10T 428/211* (2015.01)

(58) Field of Classification Search
CPC ..... Y10T 428/12806; Y10T 428/12743; Y10T 428/1275; Y10T 428/12757; Y10T 428/12764; Y10T 428/12799; Y10T 428/12903; Y10T 428/12944; Y10T 428/12896; Y10T 428/12736; Y10T 428/211; Y10T 428/21; Y10T 428/12708; Y10T 428/12569; Y10T 428/12576; Y10T 428/12986; Y10T 428/12951; Y10T 428/12937; Y10T 428/12931; Y10T 428/12917; Y10T 428/12715; Y10T 428/12722; Y10T 428/1291; Y10T 428/12924; Y10T 428/12979; Y10T 428/12972; C10M 107/00; C10M 107/38; C10M 2213/06; C10M 2213/062; C10M 2213/066; C10M 2213/061; C10M 2201/066; C10M 2201/061; F16H 57/041; F16H 1/02; F16H 7/06; F16H 55/06; F16H 55/30; F16H 55/32; B62M 9/105; C23C 30/00; C23C 30/005; C23C 28/30; C23C 28/02; C23C 28/0324; C23C 28/324; C23C 28/00; B32B 15/00; B32B 15/01; C10N 2050/14; A01K 89/0189; A01K 89/01; A01K 87/04; C25D 7/00; C25D 5/10; C25D 5/34; C25D 5/48
See application file for complete search history.

(56) References Cited

U.S. PATENT DOCUMENTS

| | | | | |
|---|---|---|---|---|
| 6,575,635 | B1* | 6/2003 | Tsuji | F16C 33/124 384/276 |
| 2005/0196634 | A1* | 9/2005 | Abe | C25D 5/14 428/615 |
| 2008/0312357 | A1 | 12/2008 | Tanaka et al. | |
| 2009/0159451 | A1* | 6/2009 | Tomantschger | C25D 15/00 205/96 |
| 2010/0319647 | A1* | 12/2010 | Ogawa | C22C 21/00 123/193.2 |
| 2011/0284303 | A1* | 11/2011 | Shwartz | B62M 6/70 180/220 |
| 2015/0093595 | A1* | 4/2015 | Asakawa | C10M 107/38 428/640 |

FOREIGN PATENT DOCUMENTS

| | | |
|---|---|---|
| DE | 10 2008 026 519 A1 | 12/2008 |
| DE | 10 2008 037 871 A1 | 2/2010 |
| JP | 63-246506 A * | 10/1988 |
| JP | 03-068778 * | 3/1991 |
| JP | 03-068778 A * | 3/1991 |
| JP | 3-68778 A | 3/1991 |
| JP | 2000-333572 A | 12/2000 |
| JP | 2001-226798 A * | 8/2001 |
| JP | 2003-220681 A | 8/2003 |
| JP | 2007-71032 A | 3/2007 |
| JP | 2009-191291 A | 8/2009 |
| JP | 2010-522856 A | 7/2010 |
| JP | 4681161 B2 | 2/2011 |
| JP | 4681161 B2 * | 5/2011 |
| JP | 3185765 U | 8/2013 |

OTHER PUBLICATIONS

Machine Translation, Maysuyoshi, JP 4681161 B2, May 2011. (Year: 2011).*

Machine Translation, Maysuyoshi, JP 2001-226798, Aug. 2001. (Year: 2001).*

Machine Translation, Futamura, JP 03-068778, Mar. 1991. (Year: 1991).*

Machine Translation, Watanabe, JP 63-246506 A, Oct. 1988. (Year: 1988).*

Notification of Re-examination of corresponding Chinese Application No. 201410185310.5, dated Feb. 27, 2019.

First Statement of Alleged Common Knowledge Evidence, Asserted by the Chinese Examiner in Notification of Re-examination of the corresponding Chinese Application No. 201410185310.5, dated Feb. 27, 2019.

Second Statement of Alleged Common Knowledge Evidence, Asserted by the Chinese Examiner in Notification of Re-examination of the corresponding Chinese Application No. 201410185310.5, dated Feb. 27, 2019.

(56) References Cited

OTHER PUBLICATIONS

Third Statement of Alleged Common Knowledge Evidence, Asserted by the Chinese Examiner in Notification of Re-examination of the corresponding Chinese Application No. 201410185310.5, dated Feb. 27, 2019.

* cited by examiner

SLIDE MEMBER, BICYCLE COMPONENT USING SLIDE MEMBER, AND FISHING TACKLE COMPONENT USING SLIDE MEMBER

CROSS-REFERENCE TO RELATED APPLICATIONS

This application claims priority under 35 U.S.C. § 119 to Japanese Patent Application No. 2013-207377, filed on Oct. 2, 2013, Japanese Patent Application No. 2013-207378, filed on Oct. 2, 2013 and Japanese Patent Application No. 2013-218457, filed on Oct. 21, 2013. The entire disclosures of Japanese Patent Application Nos. 2013-207377, 2013-207378 and 2013-218457 are hereby incorporated herein by reference.

BACKGROUND

Field of the Invention

The present invention relates to a slide member, a bicycle component using the slide member, a fishing tackle component using the slide member, and method of manufacturing the slide member.

Background Information

One type of slide member known in the prior art has a plated slide layer which incorporates fine particles of a fluorine compound within a plated film of metal, such as nickel, formed on a base material (for example, see Japanese Patent Publication 4681161). The sliding performance of the plated slide layer varies depending on the content of the fine particles of the fluorine compound, with higher content of the fine particles of the fluorine compound being associated with higher sliding capabilities.

SUMMARY

Higher content of fine particles of a fluorine compound in a plated slide layer results in higher sliding capabilities. However, while higher content of fine particles of a fluorine compound in a plated slide layer results in enhanced sliding capabilities, the plated slide layer becomes susceptible to peeling.

Moreover, when titanium alloy is employed as the base material, it is difficult to enhance the sliding performance. When a plated slide layer is formed on the surface of a titanium alloy, the plated slide layer is susceptible to peeling. It is an object of the present invention to make the plated slide layer in a slide member resistant to peeling, while enhancing the sliding performance.

The slide member according to the present invention is provided with a base material, a plated slide layer containing a solid lubricant, and an intermediate plated layer situated between the base material and the plated slide layer, and adapted for increasing cohesion of the base material and the plated slide layer. The solid lubricant content of the plated slide layer is between 30 and 70 vol %, inclusive.

With this slide member, the plated slide layer containing the solid lubricant is not formed directly over the base material; instead, the intermediate plated layer for increasing cohesion of the base material and the plated slide layer is situated between the base material and the plated slide layer. Despite formation of a plated slide layer having higher sliding capabilities than the prior art by virtue of a solid lubricant content of between 30 and 70 vol %, inclusive, within the plated slide layer, cohesion between the plated slide layer and the intermediate plated layer, and cohesion between the intermediate plated layer and the base material is high, and the plated slide layer resists peeling.

The base material is of at least one selected from a group of metals that includes iron (including stainless steel), aluminum, titanium, clad materials composed of layers of multiple metals, and alloys of these. In this case, the base material will be made of metal and will be a material that can offer relatively high corrosion resistance capabilities, whereby the slide member can be used outdoors.

The plated slide layer and the intermediate plated layer may contain at least one metal selected from the group consisting of nickel, copper, tin, and zinc. In this case, the plated slide layer and the intermediate plated layer can be readily formed using metals which are easily plated.

The plated slide layer and the intermediate plated layer contain metal of the same type, selected from the group consisting of nickel, copper, tin, and zinc. In this case, because the same type of easily-plated metal is employed in the plated slide layer and the intermediate plated layer, the cohesion of the plated slide layer and the intermediate plated layer can be increased.

The intermediate plated layer may contain a solid lubricant in a smaller quantity than the solid lubricant contained in the plated slide layer. In this case, because the intermediate plated layer contains a solid lubricant as well, albeit in a smaller quantity than the plated slide layer, the sliding performance overall is even better, and cohesion between the plated slide layer and the intermediate plated layer is improved further.

The intermediate plated layer need not contain a solid lubricant. In this case, because the intermediate plated layer does not contain solid lubricants, which are relatively costly, the cost of the slide member can be reduced.

The solid lubricant may contain particles of a fluorine compound. In this case, there can be formed a fluorine compound-containing plated film that contains particles of a fluorine compound, whereby the sliding performance of the plated slide layer can be enhanced.

The content of the fluorine compound particles may be between 30 and 70 vol %, inclusive. In this case, due to the high proportion of the fluorine compound in the plated slide layer, the sliding performance of the plated slide layer is enhanced. Moreover, because the intermediate plated layer is situated between the plated slide layer and the base material, despite the fact that the content has been increased to achieve enhanced sliding capabilities, high cohesion can be maintained between the base material and the plated slide layer.

The solid lubricant may contain particles of at least one selected from the group consisting of boron nitride, molybdenum disulfide, polytetrafluoroethylene, tetrafluoroethylene-hexafluoropropylene copolymer, tetrafluoroethylene-perfluoroalkyl vinyl ether copolymer, polychlorotrifluoroethylene, and tetrafluoroethylene-ethylene copolymer.

The fluorine compound may be at least one selected from the group consisting of polytetrafluoroethylene, tetrafluoroethylene-hexafluoropropylene copolymers, tetrafluoroethylene-perfluoroalkyl vinyl ether copolymers, polychlorotrifluoroethylene, and tetrafluoroethylene-ethylene copolymers.

The plated slide layer and the intermediate plated layer may be formed through an electroplating process. In this case, the thickness of the plated slide layer and the intermediate plated layer, as well as the solid lubricant content within the plated slide layer and the intermediate plated layer, can be controlled with high accuracy, by varying the current value.

The thickness of the intermediate plated layer may be 50% or less of the thickness of the plated slide layer. In this case, because the thickness of the intermediate plated layer is half or less the thickness of the plated slide layer, it is possible to enhance the sliding performance while ensuring the necessary cohesion.

The slide member according to another aspect of the present invention is provided with a base material made of titanium alloy, and a first plated layer situated on the base material. Because this slide member has the first plated layer, despite employing a lightweight titanium alloy as the base material, as long as a plated layer of enhanced sliding capabilities is formed over the first plated layer, the plated layer of enhanced sliding capabilities will resist peeling.

The first plated layer may contain zinc. In this case, a plated layer that resists peeling from the base material can be formed by the first plated layer containing zinc. In so doing, when a plated layer of enhanced sliding capabilities is formed over the first plated layer, the plated layer will resist peeling.

The slide member may be further provided with a second plated layer situated over the first plated layer. In this case, the second plated layer can be made to resist delamination by the first plated layer, despite enhanced sliding capabilities of the second plated layer.

The second plated layer may contain nickel. In this case, the second plated layer readily forms into a lubricant layer in which a solid lubricant has been dispersed.

The second plated layer may further contain a solid lubricant. In this case, the sliding performance of the second plated layer can be enhanced further by the solid lubricant.

The second plated layer may be a layer devoid of a solid lubricant, and the slide member may be further provided with a third plated layer situated over the second plated layer. The third plated layer contains nickel and a solid lubricant. In this case, the third plated layer is one having enhanced sliding capabilities, containing nickel and a solid lubricant. Moreover, due to the three-layer structure of the plated layers, by designing the first plated layer to resist delamination from the base material, the second plated layer to resist delamination from the first plate layer, and furthermore the third plated layer of enhanced sliding capabilities to resist delamination from the second plated layer, the third plated layer can be made to further resist delamination.

The solid lubricant may contain particles of at least one selected from the group consisting of boron nitride, molybdenum disulfide, polytetrafluoroethylene, tetrafluoroethylene-hexafluoropropylene copolymers, tetrafluoroethylene-perfluoroalkyl vinyl ether copolymers, polychlorotrifluoroethylene, and tetrafluoroethylene-ethylene copolymers.

The present invention in another aspect may provide a bicycle component employing the aforedescribed slide member. In this case, the sliding performance of the bicycle component can be enhanced for a prolonged period.

The bicycle component may be a front sprocket. In this case, the sliding performance of the front sprocket can be enhanced for a prolonged period.

The bicycle component may be a rear sprocket. In this case, the sliding performance of the rear sprocket can be enhanced for a prolonged period.

The bicycle component may be a chain. In this case, the sliding performance of the chain can be enhanced for a prolonged period.

The present invention in another aspect may provide a fishing tackle component having the aforedescribed slide member. In this case, the sliding performance of the fishing tackle component can be enhanced for a prolonged period.

The method of manufacturing a slide member according to another aspect of the present invention for manufacturing the slide member includes a degreasing step for degreasing a metal base material; an oxide film removal step for removing an oxide film from the surface of the degreased base material; an intermediate plated layer formation step for forming an intermediate plated layer on at least a portion of the base material from which the oxide film has been removed; and a plated slide layer formation step for forming a plated slide layer on the outer surface of the intermediate plated layer.

According to this method of manufacturing a slide member, the surface of the metal base material undergoes a degreasing process, at least a portion of an intermediate plated layer is formed on the surface of the metal base material having undergone the degreasing process, and a plated slide layer is formed on the outer surface of the intermediate plated layer. Therefore, by increasing cohesion between the base material and the plated slide layer by the intermediate plated layer, the plated slide layer can be made to resist delamination, despite having enhanced sliding capabilities.

According to the present invention, despite the enhanced sliding capabilities of the plated slide layer, cohesion of the plated slide layer and the intermediate plated layer, and cohesion of the intermediate plated layer and the base material, is higher, and the plated slide layer resists peeling.

According to another aspect of the present invention, a plated slide layer of enhanced sliding performance can be made to resist peeling, despite the use of titanium alloy as the base material.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
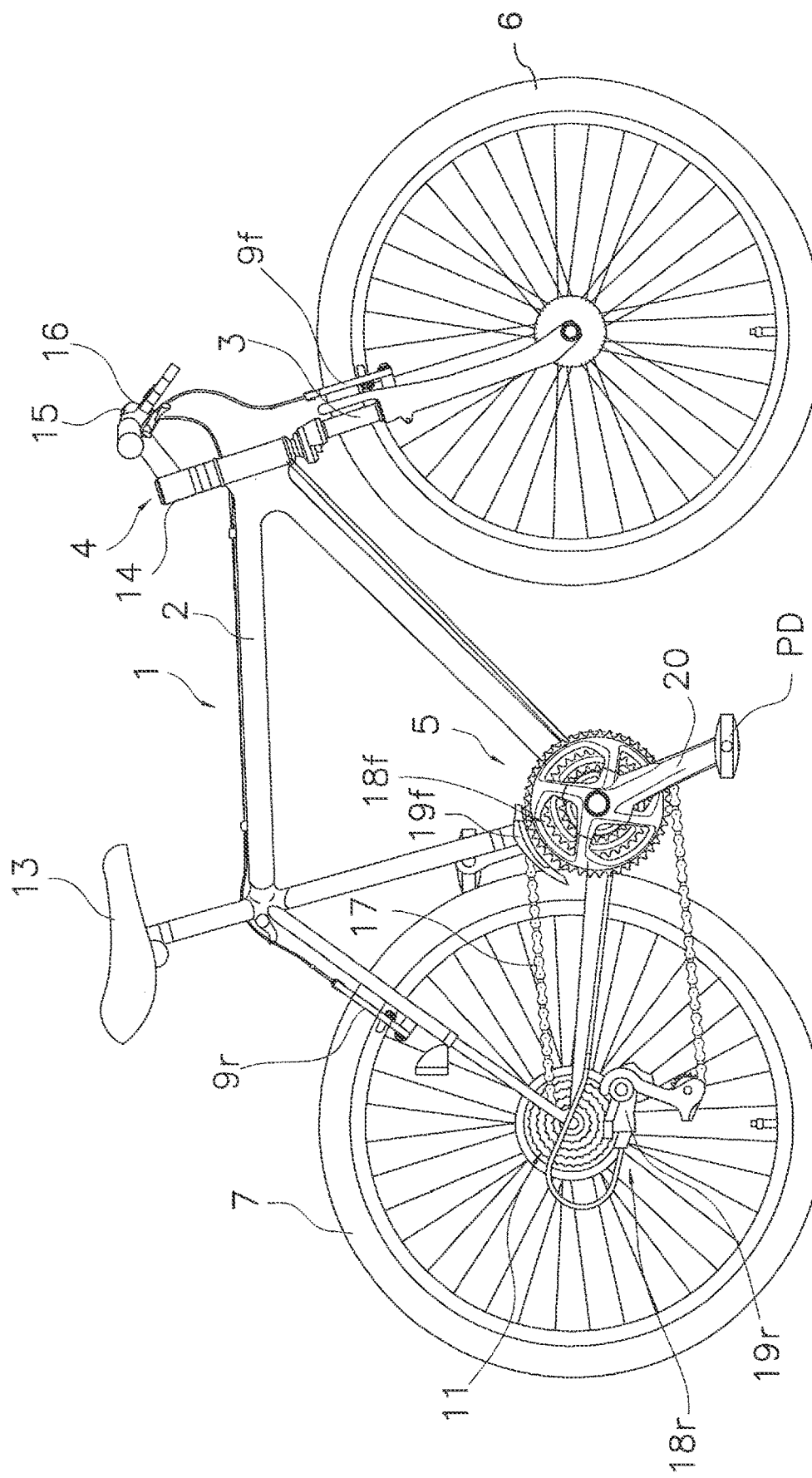
FIG. 1 is a side view of a bicycle employing a first embodiment of the present invention.

The bicycle shown in FIG. 1, which employs multiple embodiments of the present invention, is known as a mountain bike, capable of traveling over uneven terrain. The bicycle is provided with a frame 1 having diamond-shaped frame body 2 and a front fork 3 that has a suspension function; a handlebar part 4; a drive part 5; a front wheel 6; a rear wheel 7; a front brake device 9f, and a rear brake device 9r.

The frame body 2 of the frame 1 is constructed from welded pipe. Various parts, including a saddle 13 and the drive part 5, are mounted onto the frame body 2. The front fork 3 is installed in swiveling fashion about an inclined axis, at the front part of the frame body 2.

The handlebar part 4 has a handlebar stem 14 fastened to the top part of the front fork 3, and a handlebar 15 fastened to the handlebar stem 14 At the ends of the handlebar stem 15 are installed brake levers 16 for operating the front brake device 9f and the rear brake device 9r. The left and right brake levers 16 are furnished with integrated or separate shift levers (not shown) for shift operation of a front external shift device 18f and a rear external shift device 18r.

The drive part 5 has a crank assembly 20 furnished to a hanger part in the bottom part of the frame body 2; a chain 17 engaged about the crank assembly 20; and the front external shift device 18f and rear external shift device 18r. The front external shift device 18f and the rear external shift device 18r respectively have a front derailleur 19f and a rear derailleur 19r installed in the middle and rear parts of the frame 1. The front derailleur 19f guides the chain 17 onto any of, for example, three front sprockets furnished to the crank assembly 20. The rear derailleur 19r guides the chain 17 onto any of, for example, nine rear sprockets of a rear sprocket assembly 11 installed on the hub of the rear wheel 7.

Embodiment 1

Figure 2:
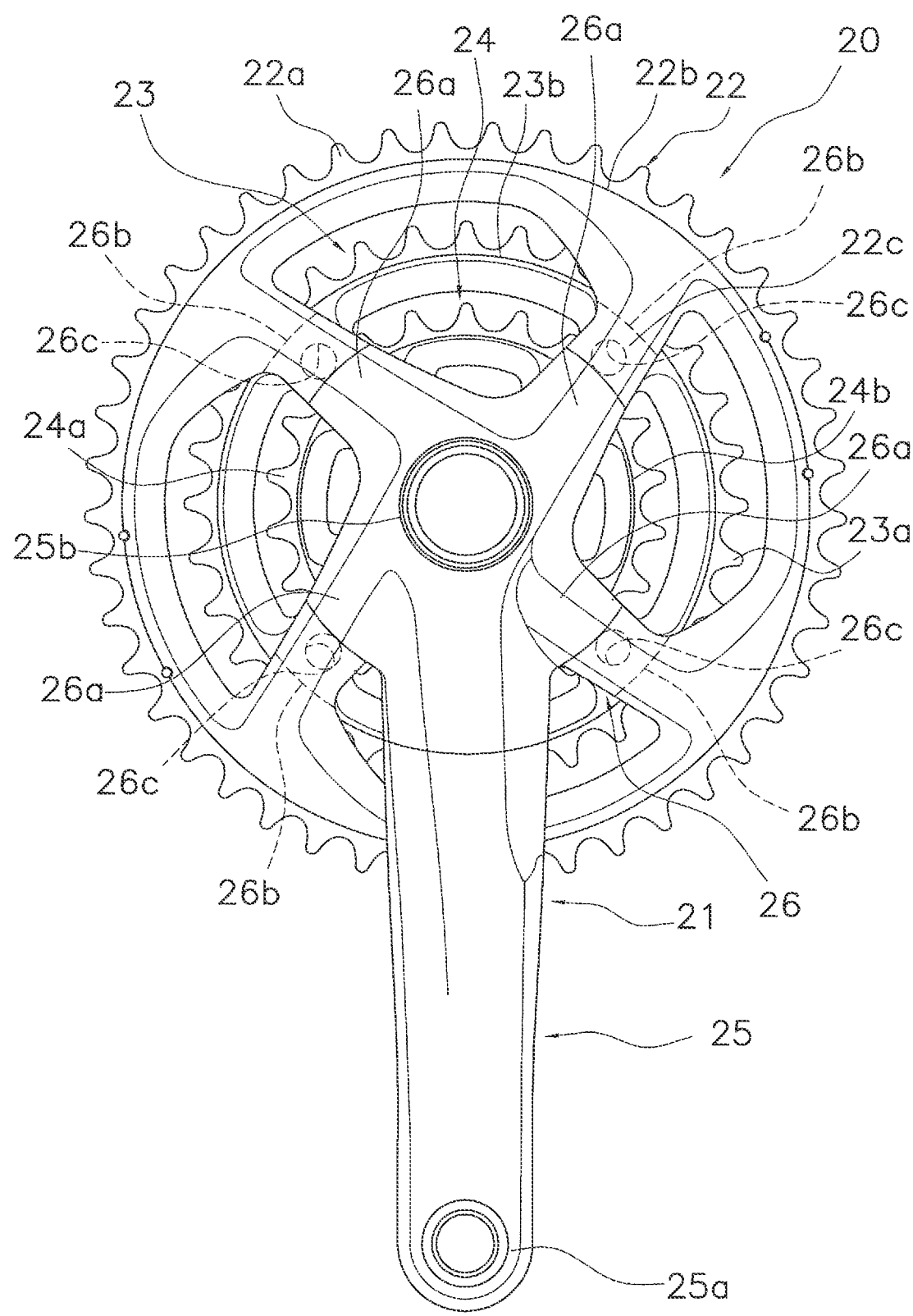
FIG. 2 is a front view of a crank assembly employing as the front sprocket one that is a bicycle component according to the first embodiment of the present invention.

As shown in FIG. 2, the crank assembly 20 which employs a first embodiment of the present invention is provided with a crank part 21, and a first front sprocket 22, a second front sprocket 23, and a third front sprocket 24, in accordance with the first embodiment of the present invention. The crank part 21 has a crank arm 25 extending in a radial direction in relation to the center axis of rotation of the front sprockets 22, 23, 24, and a sprocket attachment part 26 formed integrally with the crank arm 25. The crank arm 25 has a pedal attachment part 25a at the distal end, and a crank shaft attachment part 25b at the basal end. The sprocket attachment part 26 has a plurality (for example, four) of attachment arms 26a extending radially from the crank shaft attachment part 25b as the center, and sprocket fastening parts 26b furnished to the ends of the respective attachment arms 26a. In each of the sprocket fastening parts 26b is formed a through-hole 26c through which is passed a threaded member (for example, a bolt member), not illustrated, for fastening the first front sprocket 22. In the first embodiment, the threaded members are screwed into the first front sprocket 22. However, threaded members could instead be threaded together with nuts to fasten the first front sprocket 22. The first to third front sprockets 22 to 24 are an example of a bicycle component.

The first front sprocket 22 has the greatest number of teeth, for example, 42. When the first front sprocket 22 is attached to the crank shaft, not illustrated, it is situated to the outside away from the frame 1 (see FIG. 1) in the axial direction in relation to the center axis of rotation of the front sprockets 22, 23, 24. The second front sprocket 23 is situated to the inside closer to the frame 1 in relation to the first front sprocket 22. The number of teeth of the second front sprocket 23 is, for example, 32. The third front sprocket 24 is situated to the inside closer to the frame 1 in relation to the second front sprocket 23 in the axial direction. The number of teeth of the third front sprocket 24 is, for example, 24.

The first front sprocket 22, the second front sprocket 23, and the third front sprocket 24 have a first slide member 22a, a second slide member 23a, and a third slide member 24a, respectively. The first slide member 22a, the second slide member 23a, and the third slide member 24a constitute the sprocket teeth of the respective sprockets, for meshing with the chain 17 (see FIG. 1). The sprocket teeth are furnished to the outermost side of the sprocket in radial directions, and are formed to be thinner than a first attachment part 22c located at the inside therefrom in radial directions and intended to fasten to the sprocket attachment part 26 of the crank part 21 (the second attachment part of the second front sprocket 23 and the third attachment part of the third front sprocket 24 are not illustrated). In the first embodiment, the first slide member 22a and the first attachment part 22c are formed integrally. The second slide member 23a and the second attachment part, as well as the third slide member 24a and the third attachment part, are formed integrally as well. Consequently, a first stepped part 22b, a second stepped part 23b, and a third stepped part 24b are respectively formed, between the sprocket teeth and sections radially inside therefrom in the first to third front sprockets 22-24. The first slide member 22a, the second slide member 23a, and the third slide member 24a are respectively situated radially to the outside, in relation to the first stepped part 22b, the second stepped part 23b, and the third stepped part 24b.

Figure 3:
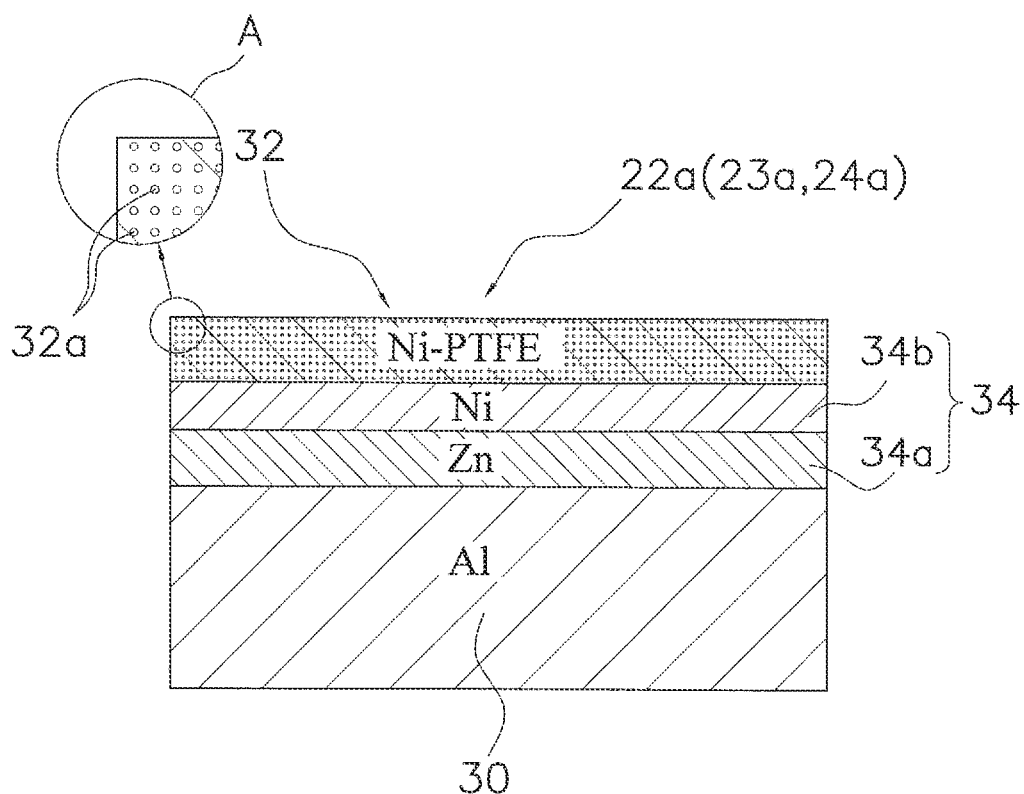
FIG. 3 is a cross sectional schematic view of the outer surface of a first front sprocket.

As shown in FIG. 3, the first slide member 22a of the first front sprocket 22 is provided with a base material 30 constituting the sprocket teeth; a plated slide layer 32; and an intermediate plated layer 34 situated between the base material 30 and the plated slide layer 32, for increasing cohesion of the base material 30 and the plated slide layer 32. The base material 30 is of at least one selected from a group of metals that includes iron (including stainless steel), aluminum, titanium, and copper (including brass); clad materials composed of layers of multiple different metals (for example, aluminum and stainless steel or the like); and alloys of these. In the first embodiment, the base material 30, including the first front sprocket 22 and the other sections, is made of aluminum alloy. The plated slide layer 32 and the intermediate plated layer 34 are plated layers containing at least one metal selected from the group that includes nickel, copper, tin, and zinc. The plated slide layer 32 and the intermediate plated layer 34 contain the same metal selected from the group that includes nickel, copper, tin, and zinc. In the first embodiment, the plated slide layer 32 contains nickel. As shown enlarged in part A in FIG. 3, the plated slide layer 32 contains a solid lubricant 32a. The solid lubricant 32a contains particles of at least one selected from the group consisting of boron nitride, molybdenum disulfide, polytetrafluoroethylene, tetrafluoroethylene-hexafluoropropylene copolymers, tetrafluoroethylene-perfluoroalkyl vinyl ether copolymers, polychlorotrifluoroethylene, and tetrafluoroethylene-ethylene copolymers. In the first embodiment, the solid lubricant has particles of a fluorine compound, including polytetrafluoroethylene, tetrafluoroethylene-hexafluoropropylene copolymers, tetrafluoroethylene-perfluoroalkyl vinyl ether copolymers, polychlorotrifluoroethylene, and tetrafluoroethylene-ethylene copolymers. In the first embodiment, polytetrafluoroethylene (PTFE) is selected as the fluorine compound. Consequently, in the first embodiment, the plated slide layer 32 has a nickel plated layer containing particles of a fluorine compound. The content of the fluorine compound particles used as the solid lubricant 32a in the first embodiment is from 30 vol % to 70 vol %, inclusive, of the entire plated slide layer 32. In this embodiment, the content is from 40 vol % to 50 vol %, inclusive.

The intermediate plated layer 34 in the first embodiment has a first intermediate plated layer 34a and a second intermediate plated layer 34b. The first intermediate plated layer 34a is formed on the outer surface of the base material 30. In the first embodiment, the first intermediate plated layer 34a contains, for example, zinc. The second intermediate plated layer 34b is formed between the first intermediate plated layer 34a and the plated slide layer 32. The second intermediate plated layer 34b contains, for example, nickel. Consequently, in the first embodiment, the plated slide layer 32 and the second intermediate plated layer 34b contain the same type of metal (nickel). The first intermediate plated layer 34a and the second intermediate plated layer 34b contain no solid lubricant. The total thickness of the plated slide layer 32 and the intermediate plated layer 34 is from 2 μm to 20 μm, inclusive. The thickness of the plated slide layer 32 is from 1 μm to 15 μm, inclusive. The thickness of the intermediate plated layer 34 is from 1 μm to 5 μm, inclusive. In preferred practice, the thickness of the intermediate plated layer 34 is 50 percent or less of the thickness of the plated slide layer 32. In the first embodiment, the thickness of the intermediate plated layer 34 is from 10 to 30 percent, inclusive, of the thickness of the plated slide layer 32. The plated slide layer 32 and the intermediate plated layer 34 are formed by an electroplating process. Therefore, the thickness of the plated slide layer 32 and the intermediate plated layer 34 is easily controlled.

The second slide member 23a of the second front sprocket 23 and of the third slide member 24a of the third front sprocket 24 are comparable in constitution to the first slide member 22a of the first front sprocket 22.

With the first slide member 22a, the second slide member 23a, and the third slide member 24a having the above constitution, the plated slide layer 32 is not formed directly over the base material 30; rather, the intermediate plated layer 34 for increasing the cohesion of the base material 30 and the plated slide layer 32 is situated between the base material 30 and the plated slide layer 32. Therefore, despite the enhanced sliding capabilities of the plated slide layer 32, cohesion between the plated slide layer 32 and the intermediate plated layer 34, and cohesion between the intermediate plated layer 34 and the base material 30, is high, making the plated slide layer 32 resistant to peeling.

The base material 30 is made of lightweight aluminum, and as such can be a material with relatively high corrosion resistance capabilities, thereby reducing the weight of the first slide member 22a to the third slide member 24a as well as making them able to withstand outdoor use. Moreover, sliding resistance with respect to the chain 17 is low, and power transmission efficiency can be improved.

Modification Example of First Embodiment

Figure 4:
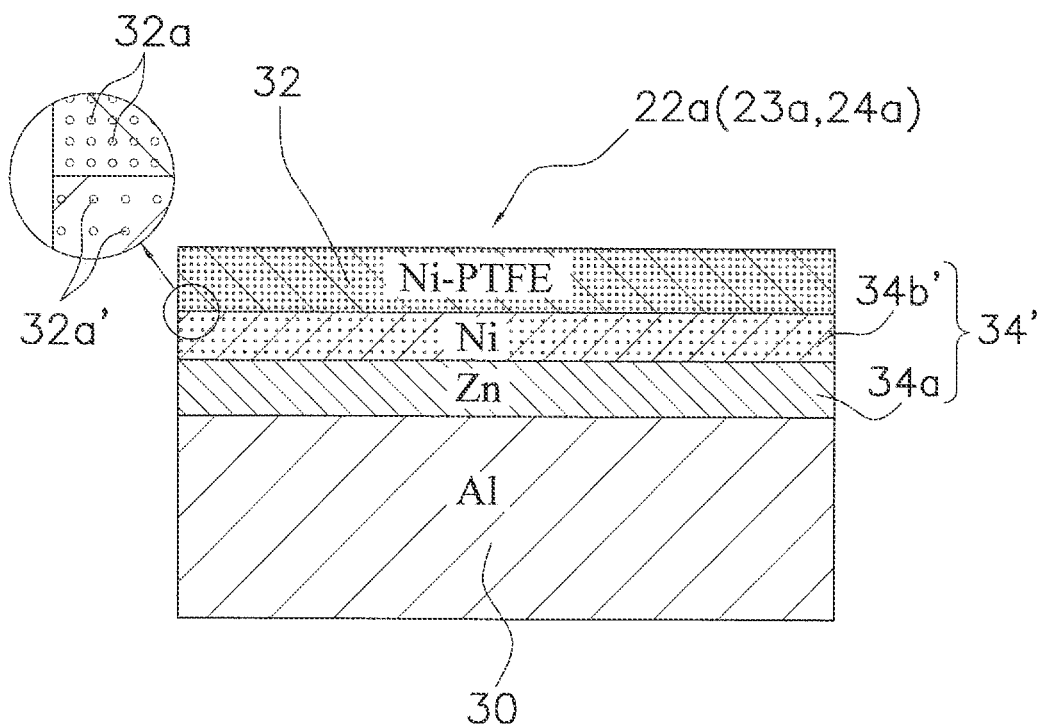
FIG. 4 is view of a modification example of the first embodiment, corresponding to FIG. 3.

In the modification example in FIG. 4, the second intermediate plating layer 34b' of the intermediate plating layer 34' differs from that in the first embodiment. In the first embodiment, the second intermediate plating layer 34b contained no solid lubricant; however, as shown enlarged in part A in FIG. 4, the second intermediate plating layer 34b' contains a solid lubricant 32a', but in an amount less than that of the solid lubricant 32a contained in the plated slide layer 32. For example, the solid lubricant 32a' content is from 5 vol % to 30 vol %, inclusive, of the entire second intermediate plating layer 34b'. In this modification example, the content in the solid lubricant 32a' is from 10 vol % to 20 vol %, inclusive. In the modification example, the solid lubricant 32a' is a fluorine compound comparable to the solid lubricant 32a. The aforedescribed working effects can be achieved with this sort of constitution as well. The type of solid lubricant 32a' is not limited to the fluorine compounds employed in the first embodiment, but at least one type can be selected from the group given by way of example in the first embodiment.

Figure 5:
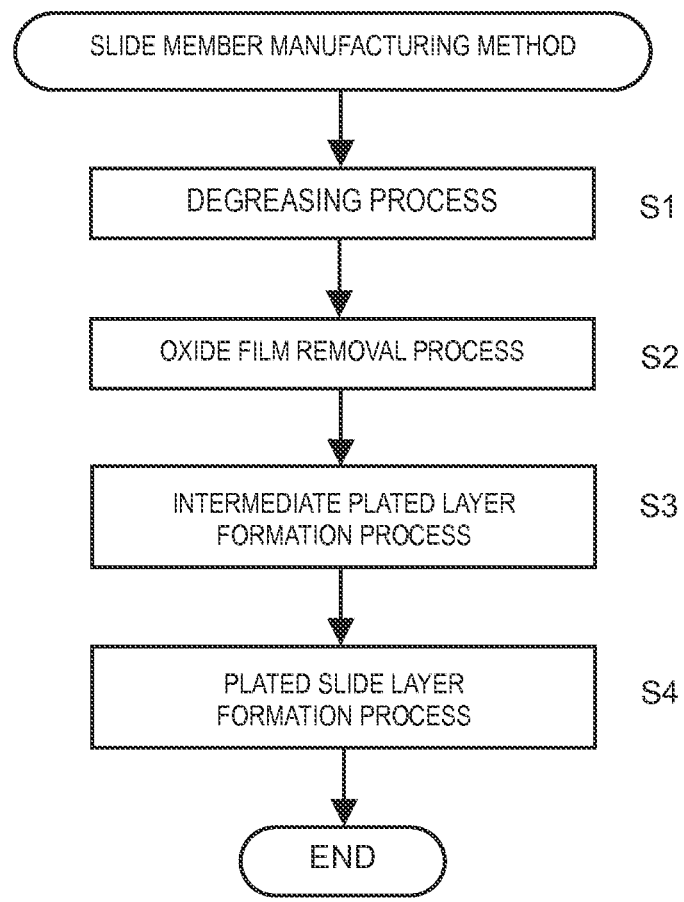
FIG. 5 is a flowchart showing a method of manufacturing a slide member.

Next, the method of manufacturing the slide member according to the first embodiment will be described with reference to FIG. 5, taking the example of the first front sprocket 22.

In the first front sprocket 22 serving as the base material, it is preferable for sections, other than that for constituting the first slide member 22a, to be masked. Then, in Step S1, the section for constituting the first slide member 22a is subjected to a degreasing process using a degreasing detergent, producing a clean state on the surface. In Step S2, the aluminum oxide film which has formed on the surface of the first slide member 22a of the first front sprocket 22 is removed. In Step S3, the intermediate plated layer 34 is formed. According to the first embodiment, in the intermediate plated layer formation process of Step S3, the first intermediate plated layer 34a is formed over the base material 30, and then the second intermediate plated layer 34b is formed over the first intermediate plated layer 34a. Here, the first intermediate plated layer 34a is zinc (Zn) plated by an electroplating process, and the second intermediate plated layer 34b nickel plated by an electroplating process. In the modification example, the second intermediate plated layer 34b' is formed through plating of nickel containing a fluorine compound as a solid lubricant, by an electroplating process. The vol % of the fluorine compound in the second intermediate plated layer 34b' is less than that in the plated slide layer 32. Once the second intermediate plated layer 34b' has been formed, the plated slide layer 32 is formed thereon by an electroplating process. The plated slide layer 32 is formed through plating of nickel containing a fluorine compound as a solid lubricant, by an electroplating process. The thicknesses of the intermediate plated layer 34' and the plated slide layer 32 are controlled to the values given above, through the electroplating process.

Embodiment 2

Figure 6:
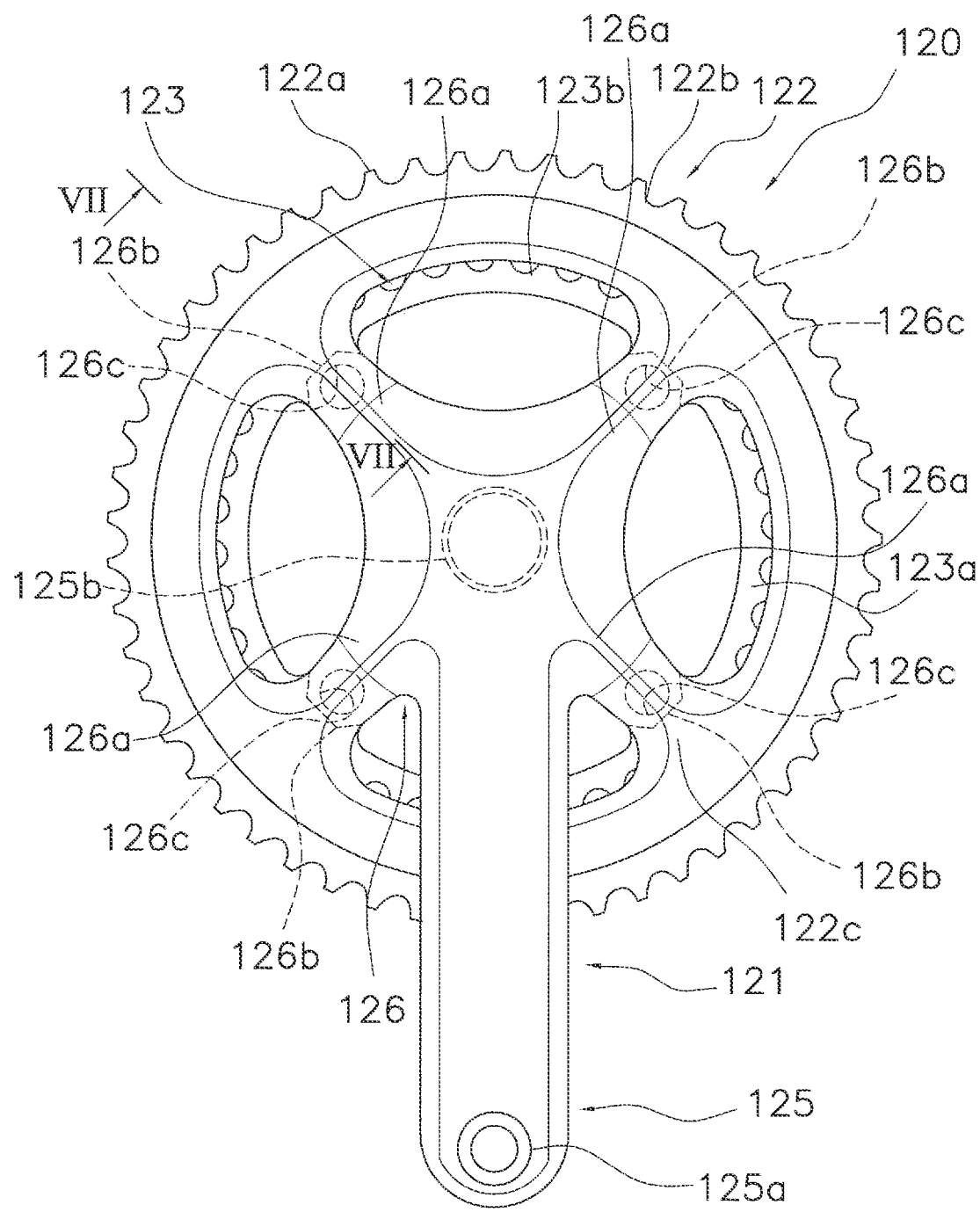
FIG. 6 is a front view of a crank assembly employing as the front sprocket one that is a bicycle component according to the second embodiment of the present invention.
Figure 7:
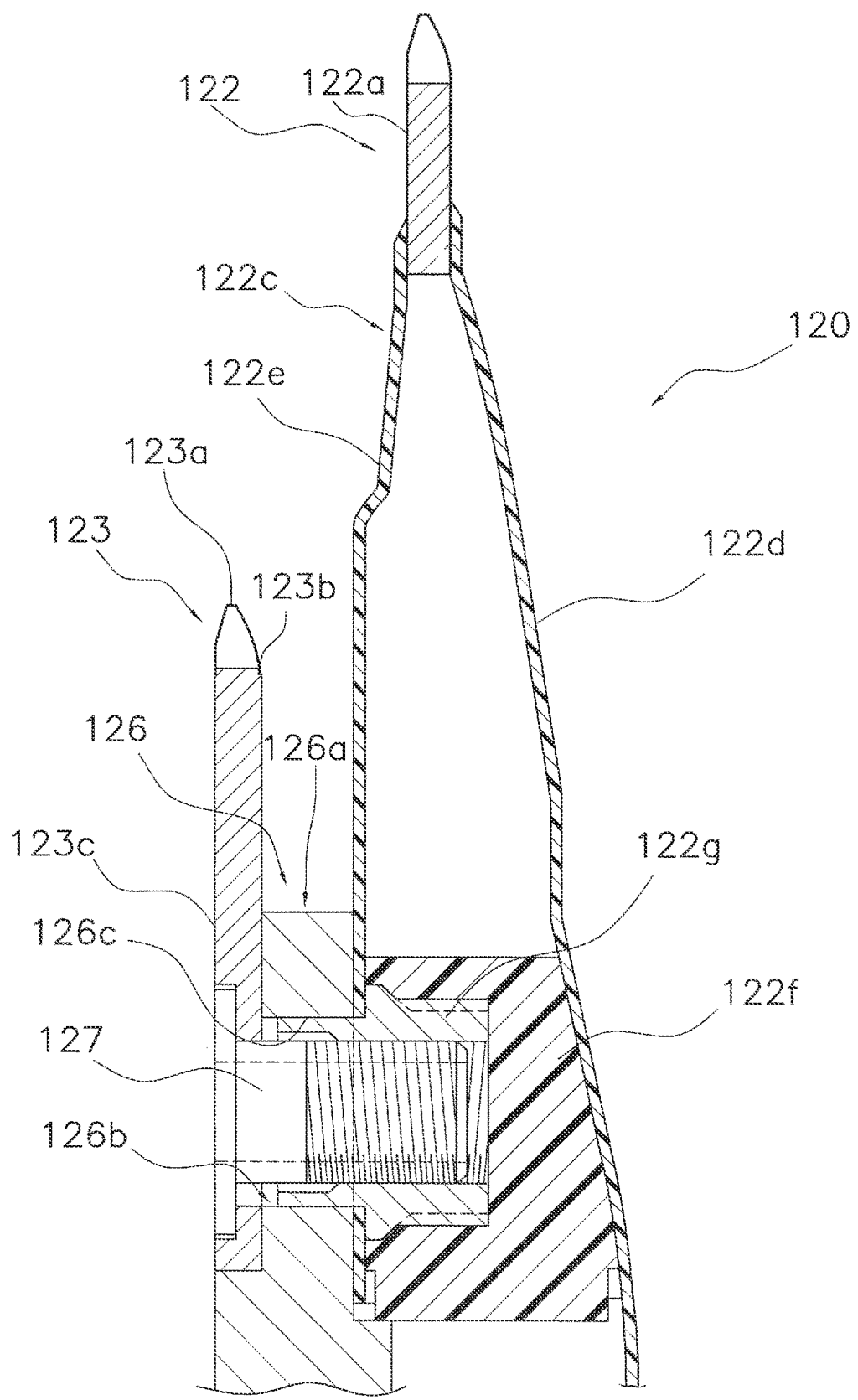
FIG. 7 is an enlarged cross sectional view of the crank assembly cut along the cutting plane line VII-VII in FIG. 6.

As shown in FIGS. 6 and 7, a crank assembly 120 employing a second embodiment of the present invention is provided with a crank part 121, and a first front sprocket 122 and second front sprocket 123 according to the second embodiment of the present invention. The first front sprocket 122 and the second front sprocket 123 are examples of bicycle components. The crank part 121 has a crank arm 125 extending along a radial direction in relation to the center axis of rotation of the front sprockets 122, 223; and a sprocket attachment part 126 formed integrally with the crank arm 125. The crank arm 125 has a pedal attachment part 125a at the distal end, and a crank shaft attachment part 125b at the basal end. The sprocket attachment part 126 has a plurality (for example, four) of attachment arms 126a extending radially from the crank shaft attachment part 125b as the center, and sprocket fastening parts 126b recessed into the distal ends of the respective attachment arms 126a. In each of the sprocket fastening parts 126b is formed a through-hole 126c through which is passed a threaded fastening member (for example, a bolt member) 127 (see FIG. 7) which is threaded into the first front sprocket 122.

The first front sprocket 122 has the greatest number of teeth. When attached to the crankshaft, not illustrated, the first front sprocket 122 is situated to the outside furthest away from the frame 1 (see FIG. 1) in an axial direction in relation to the center axis of rotation of the front sprockets 122, 123. The second front sprocket 123 has fewer teeth than the first front sprocket 122, and is situated to the inside closer to the frame 1 from the first front sprocket 122 in the axial direction.

Figure 8:
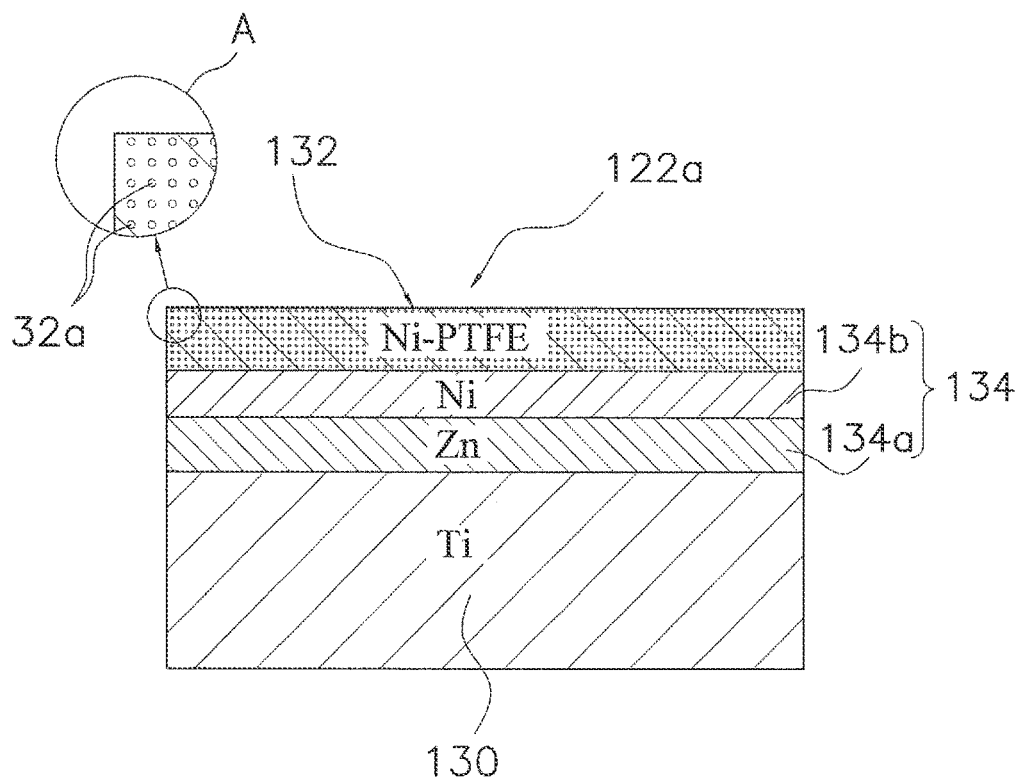
FIG. 8 is a view of a first front sprocket of the second embodiment, corresponding to FIG. 3.

The first front sprocket 122 and the second front sprocket 123 respectively have a first slide member 122a and a second slide member 123a (see FIG. 7). The first slide member 122a and the second slide member 123a constitute the sprocket teeth of the respective sprockets for meshing with the chain 17 (see FIG. 1.). The first slide member 122a is furnished furthest to the outside in a radial direction. The first front sprocket 122 further has a first attachment part 122c installed so as to be rotatable in unison with the first slide member 122a. Consequently, in the second embodiment, the first slide member 122a is formed as a separate element from the first attachment part 122c which is situated to the inside in the radial direction therefrom and fastened to the sprocket attachment part 126 of the crank part 121. The first slide member 122a is a member which is made of metal (for example, made of titanium), while the first attachment part 122c is a member made of synthetic resin (for example, made of carbon fiber-reinforced resin). As shown by heavy lines in FIG. 7, in the first front sprocket 122 of the second embodiment, a plated slide layer 132 and an intermediate plated layer 134, shown in FIG. 8, are formed on the surface of the first slide member 122a, which is a section made of metal. It is acceptable for the plated slide layer 132 and an intermediate plated layer 134 to be furnished only to portions (for example, to sections where the sprocket teeth are formed) of the first slide member 122a. As shown in FIG. 7, the first attachment part 122c has an outside member 122d molded from a plurality of carbon fiber prepregs in a mold, and an inside member 122e situated facing the outside member 122d. The inside member 122e, like the outside member 122d, is molded from a plurality of carbon fiber prepregs in a mold. The inside member 122e is situated facing towards the second front sprocket 123. The first attachment part 122c has a nut attachment part 122f made of synthetic resin (for example, synthetic resin such as polyimide resin, polyacetal resin, or the like) to which a nut member 122g that threads together with the threaded member 127 has been formed integrally, by an appropriate molding method such as insert molding. The first slide member 122a, the outside member 122d, the inside member 122e, and the nut attachment part 122f are fastened, for example, with an adhesive or by casting.

As shown by heavy lines in FIG. 7, the second slide member 123a of the second front sprocket 123 is furnished radially to the outside from a second stepped part 123b constituting a section bordering a second attachment part 123c. Consequently, as in the first embodiment, in the second front sprocket 123, the second slide member 123a and the second attachment part 123c are formed integrally.

As shown in FIG. 8, the first slide member 122a of the first front sprocket 122 in the second embodiment is provided with a base material 130 constituting the sprocket teeth, a plated slide layer 132 containing a solid lubricant, and an intermediate plated layer 134 situated between the base material 130 and the plated slide layer 132, for increasing cohesion of the base material 130 and the plated slide layer 132. The base material 130 is one type of metal selected from a group of metals that includes metals comparable to those in the first embodiment, and alloys thereof. In the second embodiment, the base material 130 is made of titanium, for example. The plated slide layer 132 and the intermediate plated layer 134 are plated layers containing at least one metal selected from a group of metals that includes metals comparable to those in the first embodiment. In the second embodiment, the plated slide layer 132 contains nickel. As shown by an enlarged view in part A in FIG. 8, the plated slide layer 132 further contains a solid lubricant 32a. The solid lubricant 32a includes particles of at least one kind selected from the same group as in the first embodiment. In the second embodiment, polytetrafluoroethylene (PTFE) is selected as the fluorine compound. Consequently, in the second embodiment, the plated slide layer 132 has a plated nickel layer containing particles of a fluorine compound. In the second embodiment, the content of the fluorine compound particles serving as the solid lubricant 32a is from 30 vol % to 70 vol %, inclusive, of the plated slide layer 132. In the second embodiment, the content is from 40 vol % to 50 vol %, inclusive.

In the second embodiment, the intermediate plated layer 134 has a first intermediate plated layer 134a and a second intermediate plated layer 134b. The first intermediate plated layer 134a is formed on the outer surface of the base material 130. In the second embodiment, the first intermediate plated layer 134a contains zinc, for example. The second intermediate plated layer 134b is formed between the first intermediate plated layer 134a and the plated slide layer 132. The second intermediate plated layer 134b contains nickel, for example. Consequently, in the second embodiment, the plated slide layer 132 and the second intermediate plated layer 134b contain the same type of metal (nickel). The first intermediate plated layer 134a and the second intermediate plated layer 134b contain no solid lubricants. The total thickness of the plated slide layer 132 and the intermediate plated layer 134 is from 2 µm to 20 µm, inclusive, and the thickness of the plated slide layer 132 is from 1 µm to 15 µm, inclusive. The thickness of the intermediate plated layer 134 is from 1 µm to 5 µm, inclusive. In preferred practice, the thickness of the intermediate plated layer 134 is 50 percent or less of the thickness of the plated slide layer 132. In the second embodiment, the thickness of the intermediate plated layer 134 is from 10 percent to 30 percent, inclusive, of the thickness of the plated slide layer 132. The plated slide layer 132 and the intermediate plated layer 134 are formed by an electroplating process. In so doing, the thickness of the plated slide layer 132 and the intermediate plated layer 134 is easily controlled.

Figure 9:
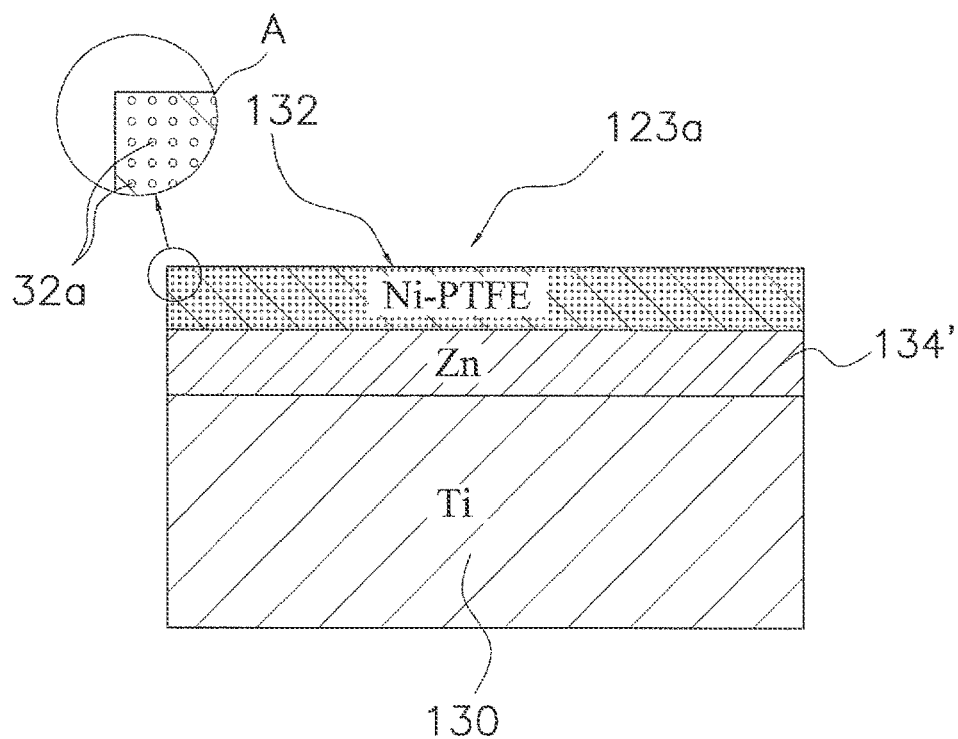
FIG. 9 is a view of a second front sprocket of the second embodiment, corresponding to FIG. 3.

As shown in FIG. 9, in the second slide member 123*a* of the second front sprocket 123 of the second embodiment, the plated slide layer 132 having the solid lubricant 32*a* as shown by an enlarged view in part A in FIG. 9 is identical to that in the first slide member 122*a* of the first front sprocket 122, whereas the intermediate plated layer 134' is different. Specifically, the intermediate plated layer 134' is constituted of a plated layer of a single metal, namely, zinc only. The thickness of the intermediate plated layer 134' is the same as that of the first slide member 122*a* of the first front sprocket 122. While the intermediate plated layer 134' contains no solid lubricant, it would be acceptable to contain a solid lubricant.

With the first slide member 122*a* and the second slide member 123*a* having the above constitution, the plated slide layer 132 is not formed directly over the base material 130; rather, the intermediate plated layer 134 (or 134') for increasing the cohesion of the base material 130 and the plated slide layer 132 is situated between the base material 130 and the plated slide layer 132. Therefore, despite the content of the solid lubricant 32*a* having been increased to enhance the sliding performance of the plated slide layer 132, cohesion between the plated slide layer 132 and the intermediate plated layer 134 (or 134'), and cohesion between the intermediate plated layer 134 (or 134') and the base material 130, is high, making the plated slide layer 132 more resistant to peeling.

The base material 130 is made of lightweight, highly corrosion-resistant titanium, thereby reducing the weight of the first slide member 122*a* and the second slide member 123*a*, as well as making them able to withstand outdoor use.

Embodiment 3

Figure 10:
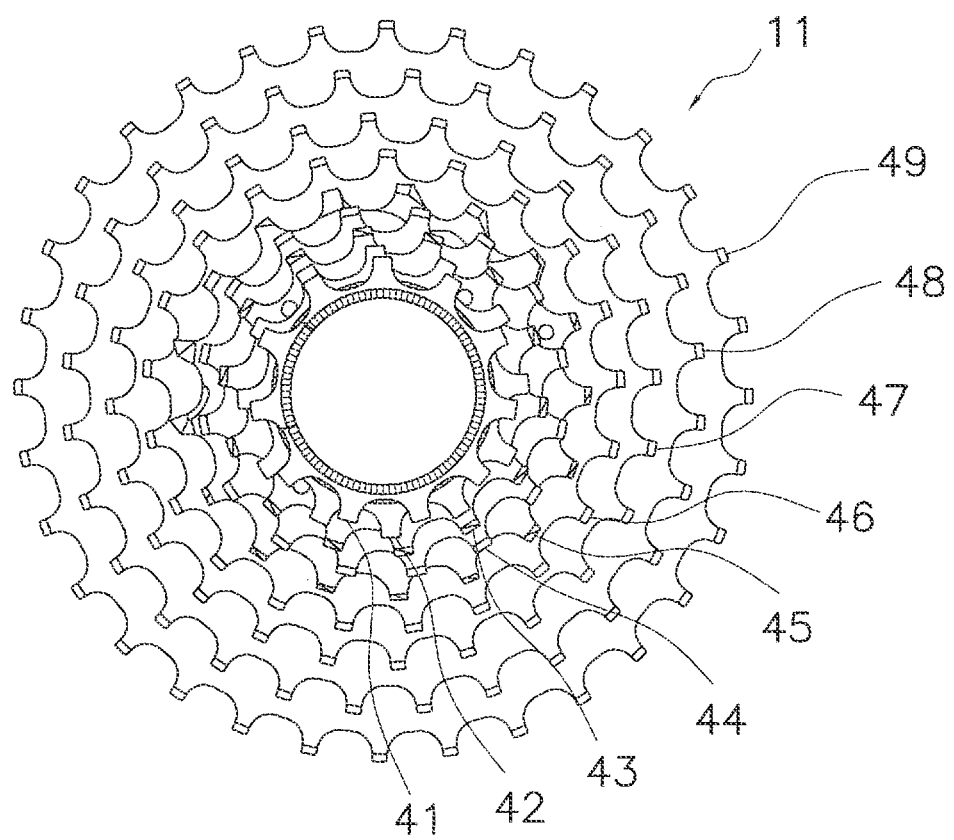
FIG. 10 is a front view of a rear sprocket assembly according to a third embodiment.
Figure 11:
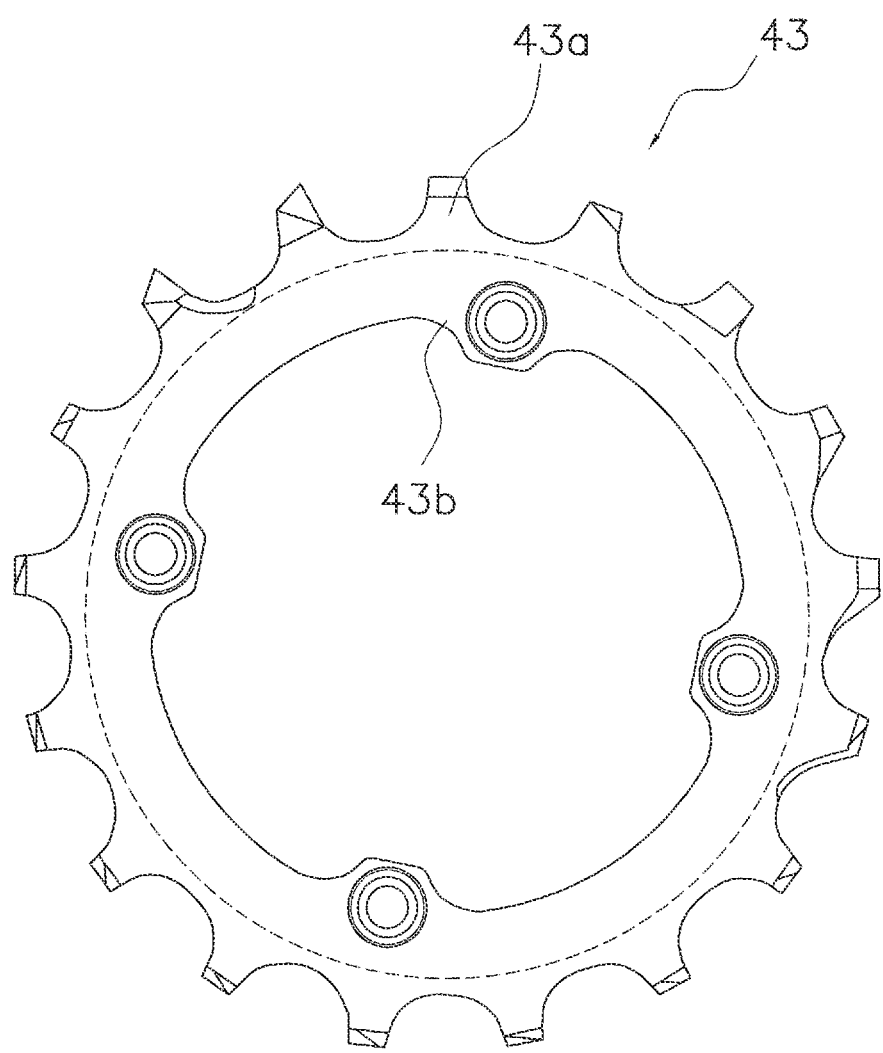
FIG. 11 is a front view of a third rear sprocket.

As shown in FIGS. 10 and 11, a rear sprocket assembly 11 employing a third embodiment of the present invention has, for example, nine rear sprockets, i.e., a first rear sprocket 41 to a ninth rear sprocket 49, that differ in the number of teeth. The first rear sprocket 41 to the ninth rear sprocket 49 are examples of a bicycle component. The first rear sprocket 41 has the fewest number of teeth, for example, 11. The ninth rear sprocket 49 has the greatest number of teeth, for example, 32. The numbers of teeth of the second rear sprocket 42 to the eighth rear sprocket 48 are set to appropriate numbers between these. The first rear sprocket 41 to the ninth rear sprocket 49 are attached in integrally rotating fashion to the rear hub of the rear wheel, not illustrated. FIG. 11 shows a third rear sprocket 43 as an example of a rear sprocket. The third rear sprocket 43 has a slide member 43*a* constituting the sprocket teeth, and an attachment part 43*b* situated at the inner peripheral side of the slide member 43*a*, for attachment to the rear hub. The other rear sprockets similarly have a slide member and an attachment part. The slide member 43*a* constitutes the sprocket teeth, and is furnished furthest radially outward. The border section between the slide member 43*a* and the attachment part 43*b* is shown by a broken line in FIG. 11.

Figure 12:
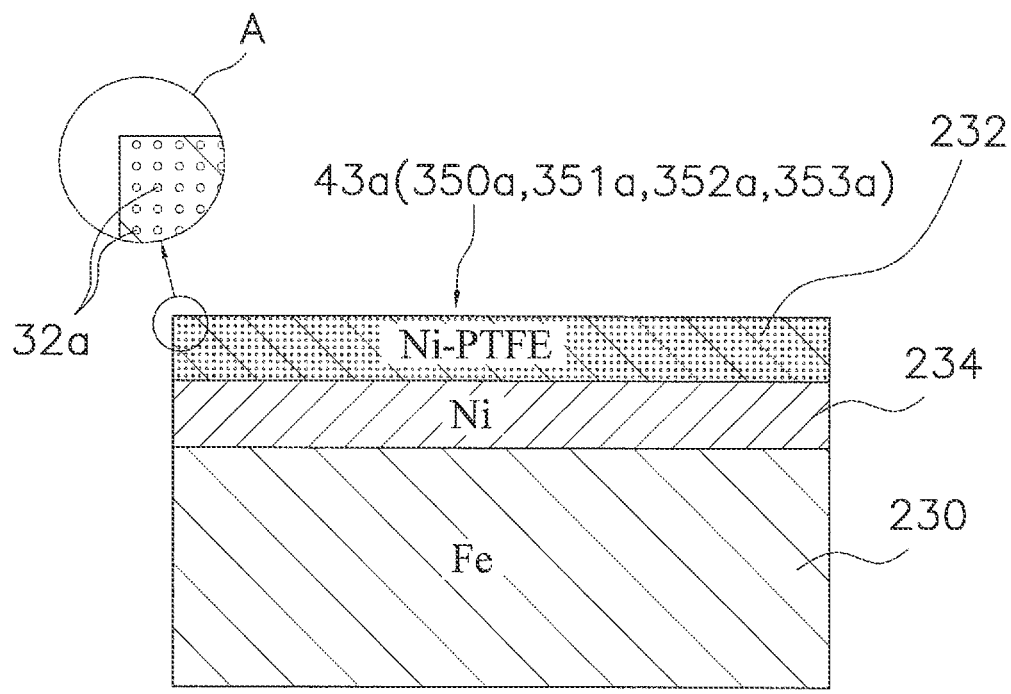
FIG. 12 is a view of a third rear sprocket of the third embodiment, corresponding to FIG. 3.

As shown in FIG. 12, the slide member 43*a* has a base material 230, a plated slide layer 232 containing a solid lubricant 32*a* as shown by an enlarged view in part A in FIG. 12, and an intermediate plated layer 234 situated between the base material 230 and the plated slide layer 232, for increasing the cohesion of the base material 230 and the plated slide layer 232. The base material 230 is at least one type of metal selected from the group of metals cited by way of example in the first embodiment; in the third embodiment, the base material 230 is made of iron, including stainless steel. The plated slide layer 232 is at least one metal selected from the group of a plurality of metals cited by way of example in the first embodiment; in the third embodiment, a eutectic system of a solid lubricant dispersed in nickel is selected. The solid lubricant is one kind selected from the group that includes a plurality of substances, cited by way of example in the first embodiment; in the third embodiment, as in the first embodiment, polytetrafluoroethylene (PTFE) is selected as the fluorine compound. The intermediate plated layer 234 is at least one metal selected from the group of a plurality of metals cited by way of example in the first embodiment; in the third embodiment, nickel is selected. In the third embodiment, the intermediate plated layer 234 contains no solid lubricant. The proportion of solid lubricant 32*a* in the plated slide layer 232 and the intermediate plated layer 234, their thicknesses, and other features are the same as in the first embodiment, and therefore description is omitted.

With the rear sprocket assembly 11 according to the third embodiment constituted as set forth above, in addition to the aforedescribed working effects, the corrosion resistance of the rear sprocket assembly 11 can be improved.

Modification Example of Third Embodiment

Figure 13:
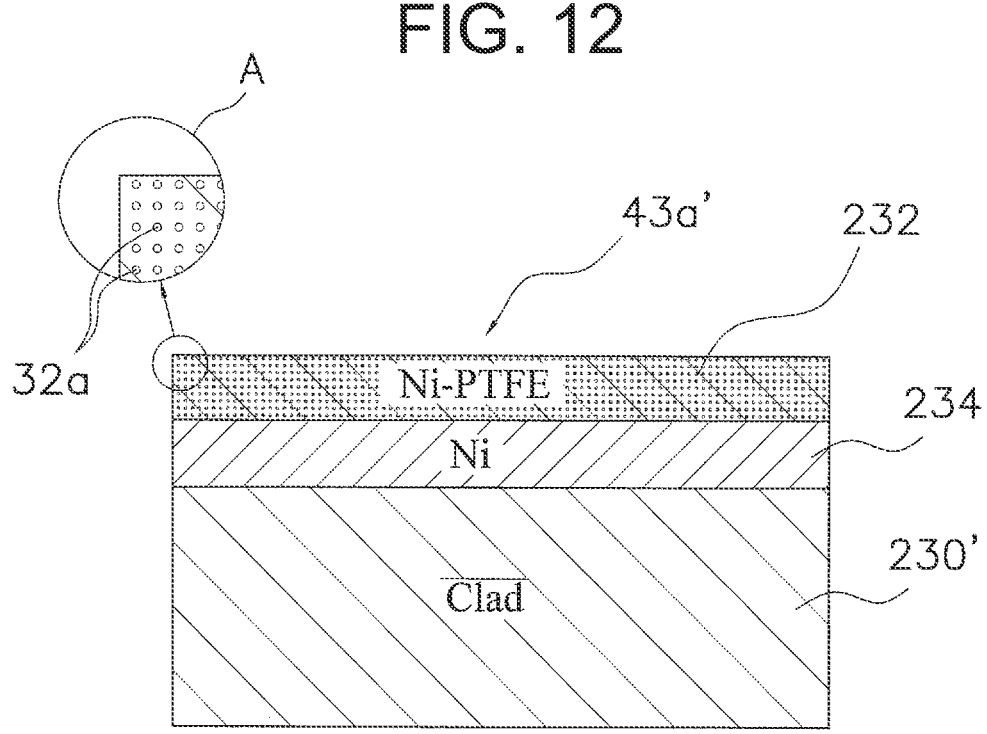
FIG. 13 is a view of a modification example of the third embodiment, corresponding to FIG. 3.

In the third embodiment, the base material 230 of the slide member 43*a* is made of iron, including stainless steel; however, in the modification example shown in FIG. 13, the base material 230' of the slide member 43*a* is made from clad material of stacked layers of different metals, rather than being made of iron. In the modification example of the third embodiment, for example, a clad material of aluminum between layers of stainless steel is employed as the base material 230'. The plated slide layer 232 having the solid lubricant 32*a* shown in enlarged view in part A in FIG. 13 and the intermediate plated layer 234 are similar to those of the third embodiment.

Embodiment 4

Figure 14:
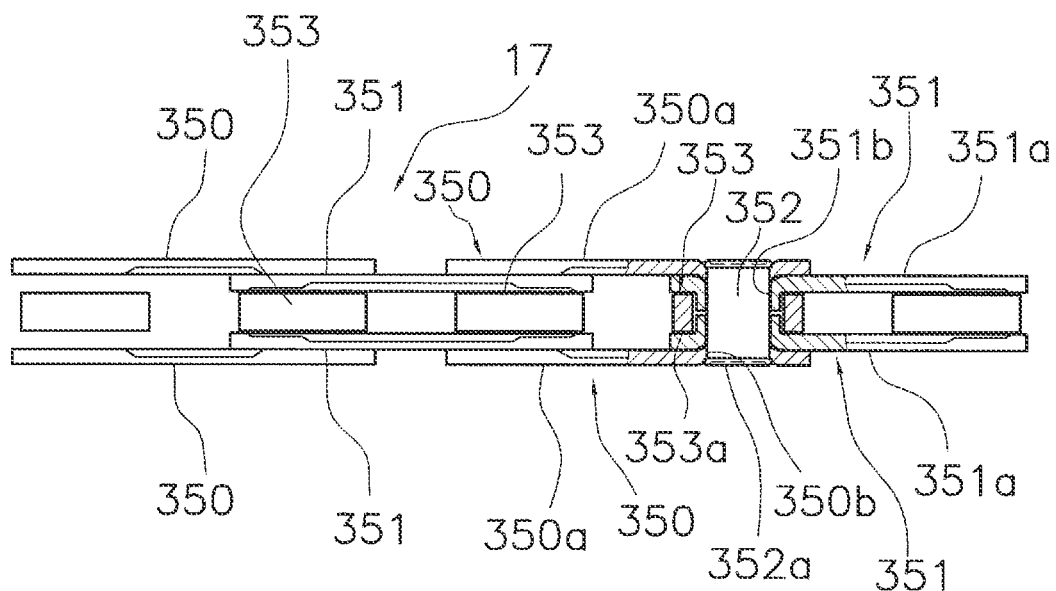
FIG. 14 is a partly sectional plan view of a chain according to fourth embodiment of the present invention.
Figure 15:
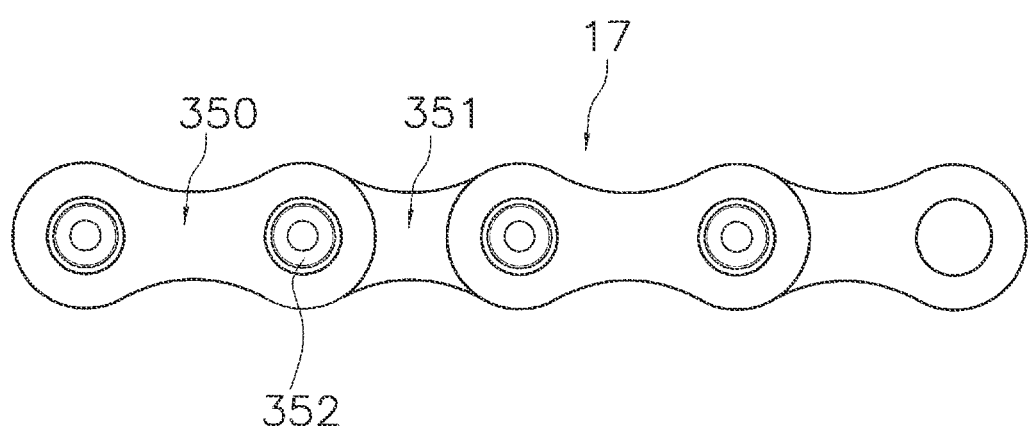
FIG. 15 is a side view of the chain.

As shown in FIGS. 14 and 15, the chain 17 provided as a bicycle component employing a fourth embodiment of the present invention has pairs of outside link plates 350, pairs of inside link plates 351 situated in alternating fashion between pairs of the outside link plates 350, linking pins 352 for linking together the linking plates 350, 351, and rollers 353 situated inside the pairs of inside link plates 351, and rotatable about the axis of the linking pin 352.

The outside link plates 350 and the inside link plates 351 are plated-shaped members of gourd shape round at both ends, formed by being punched from sheet steel, including stainless steel, about 0.8 mm-1.0 mm in thickness, for example. Linking holes 350*b*, 351*b* through which the linking pins 352 are able to be passed are formed respectively at both ends of the outside link plates 350 and the inside link plates 351. The outside link plates 350, the inside link plates 351, the linking pins 352, and the rollers 353 respectively have slide members 350a, 351a, 352a, 353a similar in constitution to the rear sprocket 43 shown in FIG. 12. The slide members 350a, 351, 352a, 353a are furnished in areas shown by heavy lines in FIGS. 14 and 15. As shown in FIG. 12, the slide members 350a, 351a, 352a, 353a have a base material 230, a plated slide layer 232 containing the solid lubricant 32a as shown by an enlarged view in part A in FIG. 12, and an intermediate plated layer 234 situated between the base material 230 and the plated slide layer 232, for increasing the cohesion of the base material 230 and the plated slide layer 232. The thickness of the plated slide layer 232 and the intermediate plated layer 234, the proportion of the solid lubricant 32a therein, and other features are the same as in the first embodiment, and therefore description is omitted.

With the chain 17 embodiment constituted as set forth above, in addition to the aforedescribed working effects, the slide resistance between the crank assembly 20 and the rear sprocket assembly 11 can be reduced, and the rotation transmission efficiency further improved. Moreover, the corrosion resistance of the chain 17 can be increased.

Embodiment 5

Whereas the aforedescribed first to fourth embodiment described the present invention in terms of examples of bicycle components, in the fifth and subsequent embodiments, the present invention is described in terms of fishing tackle components.

Figure 16:
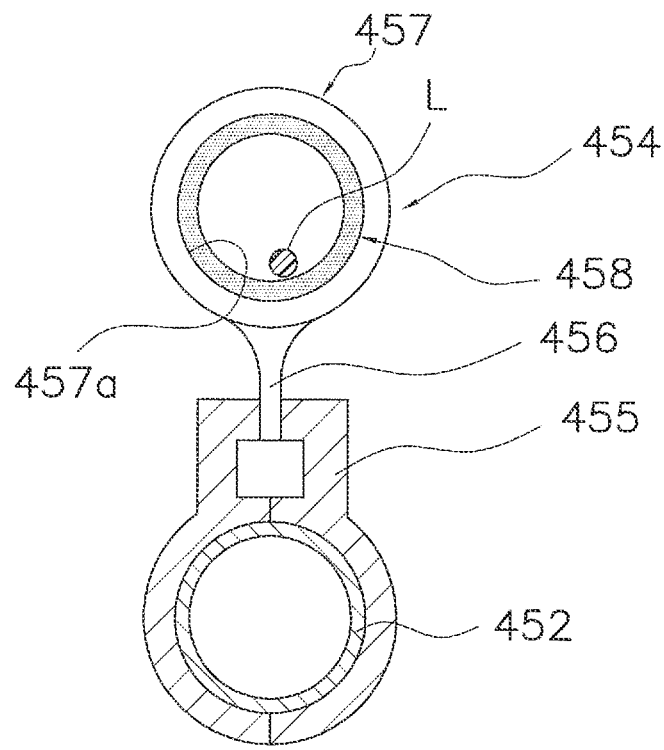
FIG. 16 is a front view of a fishing line guide that is a fishing tackle component according to a fifth embodiment of the present invention.

As shown in FIG. 16, a fishing line guide 454 employing the fifth embodiment is a member fastened to the outside peripheral surface of a fishing pole 452. The fishing line guide 454 is an example of a fishing tackle component. The fishing line guide 454 has a fastener part 455 fastening to the outside peripheral surface of the fishing pole 452; a leg part 456 rising up from the fastener part 455; a guide frame 457 having a through-hole 457a formed in the top end of the leg part 456 and passing therethrough in the axial direction of the fishing pole 452; and a guide ring 458 fitting within the through-hole 457a, through which a fishing line L is able to be threaded.

Figure 17:
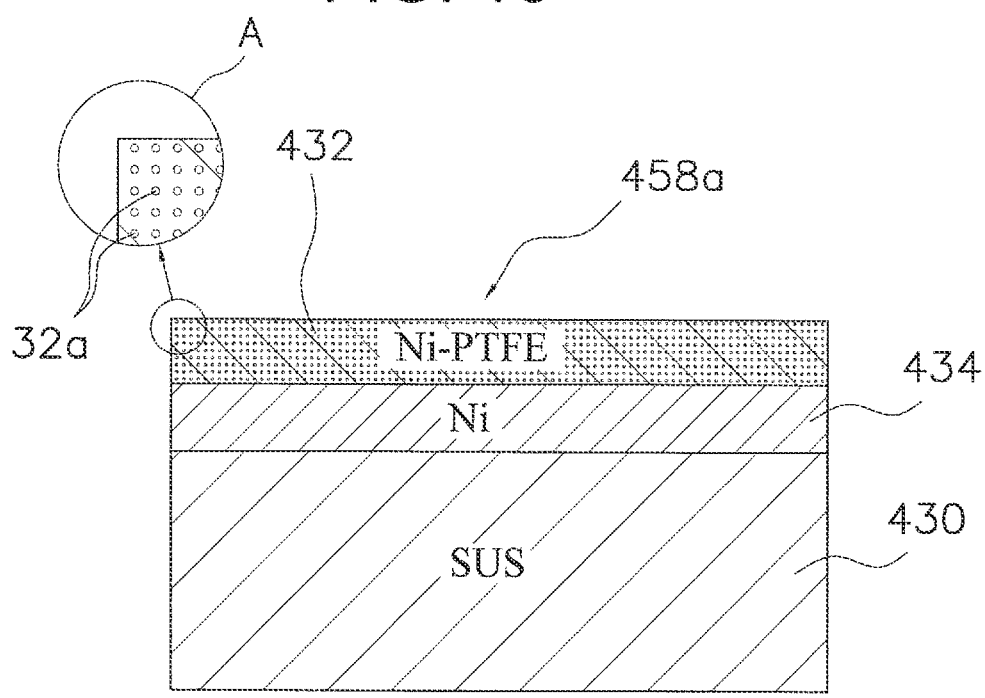
FIG. 17 is a view of the fishing line guide, corresponding to FIG. 3.

The guide ring 458 is a ring member designed to enable a fishing line to be threaded through the inside. The guide ring 458 has a slide member 458a. As shown in FIG. 17, the slide member 458a has a base material 430 of annular shape, a plated slide layer 432 containing a solid lubricant 32a as shown by an enlarged view in part A in FIG. 17, and an intermediate plated layer 434 situated between the base material 430 and the plated slide layer 432, for increasing the cohesion of the base material 430 and the plated slide layer 432. The base material 430 is, for example, an annular member made of hard metal such as stainless steel (SUS). The plated slide layer 432 and the intermediate plated layer 434 are formed to cover the entire circumference of the base material 430. The constitution of the base material 430 is comparable to that of the third embodiment shown in FIG. 12. The thickness of the plated slide layer 432 and the intermediate plated layer 434, the proportion of the solid lubricant 32a therein, and other features are the same as in the first embodiment, and therefore description is omitted.

With the fishing line guide 454 of the above constitution, in addition to the aforedescribed working effects, slide resistance against the fishing line is lower, and line problems can be reduced.

Embodiment 6

Figure 18:
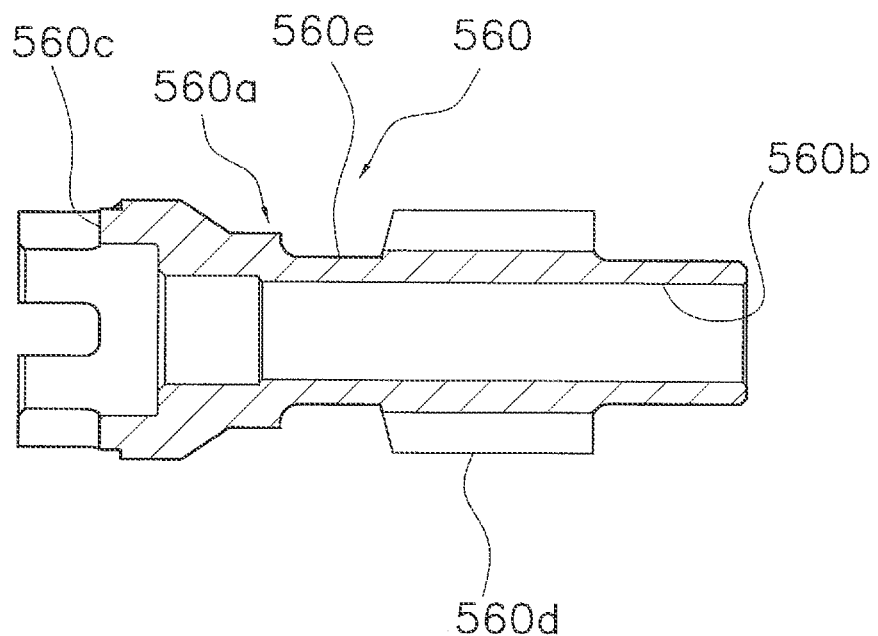
FIG. 18 is a cross sectional view of a pinion gear that is a fishing tackle component according to a sixth embodiment of the present invention.
Figure 19:
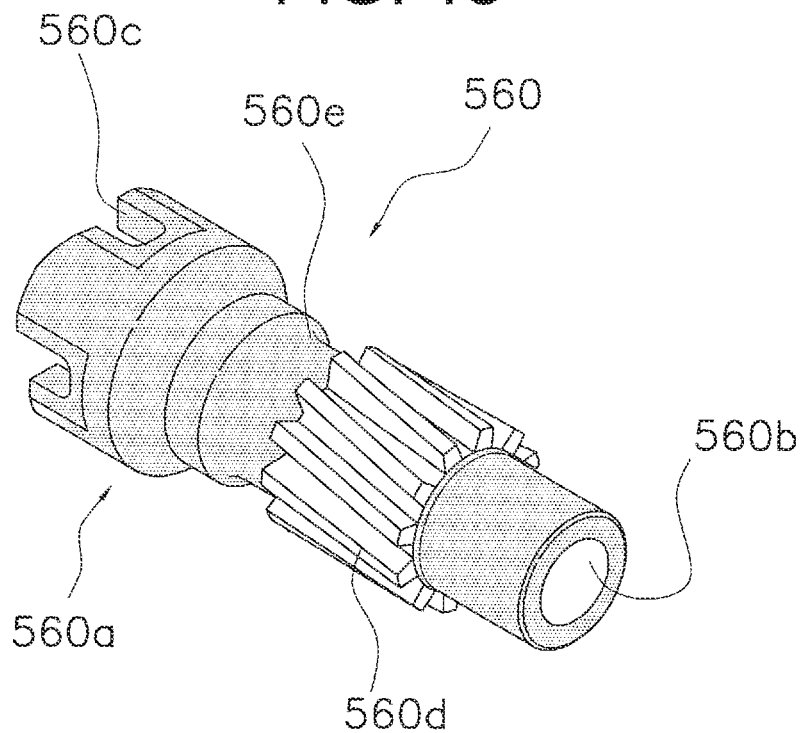
FIG. 19 is a perspective view of the pinion gear that is the fishing tackle component according to the sixth embodiment of the present invention.

As shown in FIGS. 18 and 19, a pinion gear 560 provided as a fishing tackle component employing a sixth embodiment may be used in a fishing reel, such as a double bearing reel, electrically powered reel, spinning reel, or the like. The pinion gear 560 has a slide member 560a. The slide member 560a is a cylindrical member having a stepped through-hole 560b through the center of which a spool shaft passes. The slide member 560a is supported on a reel body, not illustrated, via bearings, in such a way that both ends are rotatable and moveable in an axial direction. The slide member 560a has a clutch engagement part 560c, a gear part 560d, and a constricted part 560e. The clutch engagement part 560c is a slot for engaging a slot pin, not illustrated. The gear part 560d has gear teeth for meshing with a drive gear, not shown, that turns in interlocking fashion when a handle is operated. The constricted part 560e engages a clutch control mechanism for operating a clutch mechanism, not illustrated. The pinion gear 560 moves between an on position at which the clutch engagement part engages the clutch pin, and an off position at which the clutch engagement part releases from the clutch pin.

Figure 20:
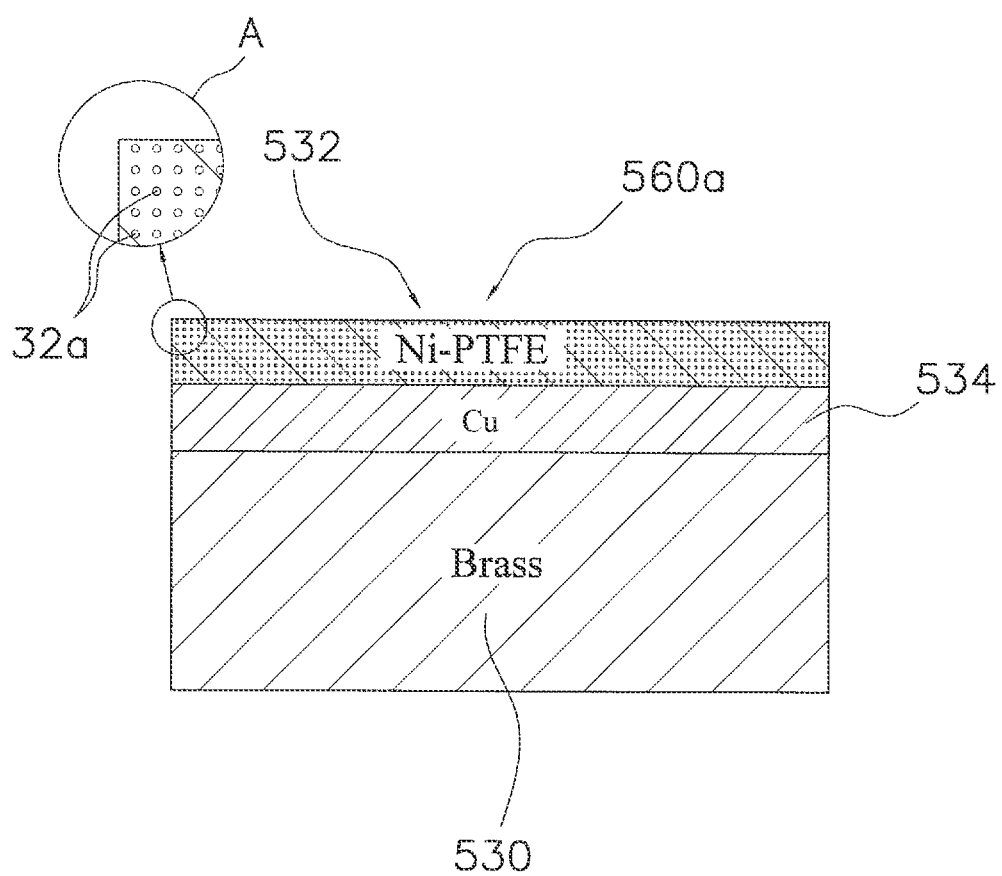
FIG. 20 is a view of the pinion gear, corresponding to FIG. 3.

As shown in FIG. 20, the slide member 560a has a base material 530, a plated slide layer 532 containing a solid lubricant 32a as shown by an enlarged view in part A in FIG. 20, and an intermediate plated layer 534 situated between the base material 530 and the plated slide layer 532, for increasing the cohesion of the base material 530 and the plated slide layer 532. In the slide member 560a, the plated slide layer 532 and the intermediate plated layer 534 are formed at locations indicated by heavy lines in FIG. 18 and at shaded locations in FIG. 19. Consequently, in the sixth embodiment, the gear part 560d in the slide member 560a is not furnished with the plated slide layer 532 and the intermediate plated layer 534. The reason is that while these plated layers are formed in the course of the pinion gear 560 manufacturing process, the gear part 560d is formed by cutting work in the final stage of manufacture. A plating process may be performed once the gear part has been formed, to furnish the gear part with a plated slide layer and an intermediate plated layer as well.

As shown in FIG. 20, the base material 530 is made of one type of metal selected from the group of metals cited by way of example in the first embodiment. In the sixth embodiment, brass is selected. The base material 530 may be made of stainless steel as well. The brass is high-strength brass of high strength. The plated slide layer 532 is at least one metal selected from the group of a plurality of metals cited by way of example in the first embodiment; in the sixth embodiment, a eutectic system in which the solid lubricant 32a is dispersed in nickel is selected. The solid lubricant is one kind selected from the group that includes the plurality of substances cited by way of example in the first embodiment; in the sixth embodiment, as in the first embodiment, polytetrafluoroethylene (PTFE) is selected as the fluorine compound. The intermediate plated layer 534 is at least one metal selected from the group of a plurality of metals cited by way of example in the first embodiment; in the sixth embodiment, copper is selected. In the sixth embodiment, the intermediate plated layer 534 contains no solid lubricant. The thickness of the plated slide layer 532 and the intermediate plated layer 534, the proportion of the solid lubricant 32a therein, and other features are the same as in the first embodiment, and therefore description is omitted.

With the pinion gear according to the sixth embodiment constituted in the above manner, in addition to the aforedescribed working effects, the rotation efficiency is improved due to the fact that the plated slide layer is formed to include both ends which are supported by bearings. Moreover, slide resistance when moving in the axial direction to the on position and the off position is low, and on-off operation of the clutch is smooth.

OTHER EMBODIMENTS

While the present invention has been described above in terms of the presently preferred embodiments, the present invention is not limited to the aforedescribed embodiments, and various modifications are possible without departing from the scope of the invention. In particular, it is possible for any of the plurality of embodiments and modification examples set forth in the description to be combined as needed.

(a) In the preceding embodiments, polytetrafluoroethylene (PTFE) is selected as the fluorine compound for the solid lubricant, but the present invention is not limited to this. The solid lubricant may contain particles of at least one selected from the aforementioned group that includes boron nitride, molybdenum disulfide, polytetrafluoroethylene, tetrafluoroethylene-hexafluoropropylene copolymers, tetrafluoroethylene-perfluoroalkyl vinyl ether copolymers, polychlorotrifluoroethylene, and tetrafluoroethylene-ethylene copolymers.

(b) In the preceding embodiments, a nickel plated layer was cited as an example of the plated slide layer, but the present invention is not limited to this. The plated slide layer may contain metals selected from the group consisting of nickel, copper, tin, and zinc.

(c) In the preceding embodiments, crank assembly sprockets, rear sprocket assembly sprockets, and a bicycle chain were cited as examples of bicycle components, while a fishing line guide and a pinion gear were cited as examples of fishing tackle components; however, the present invention is not limited to these. The bicycle component having the slide member according to the present invention may also be, for example, a control cable capable of linking a brake device and brake operation device, or a gearshift device and a gearshift operation device, and the like. The slide member according to the present invention may also be employed in the lever section of the brake lever 16, or in a sliding section in an internal or external gearshift device. As fishing tackle components, the slide member may be employed in a reeling spool, a thread section for drag adjustment, or a fishhook.

(d) The combinations of base materials, intermediate plated layers, and plate slide layers shown in the preceding embodiments are applicable in other embodiments as well.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A slide member comprising:
    a base material;
    an intermediate plated layer disposed on a first outer surface of the base material between the base material and the plated slide layer; and
    a plated slide layer disposed on a second outer surface of the intermediate plated layer, the plated slide layer containing a first solid lubricant,
    the plated slide layer having a thickness of 1 μm to 15 μm and having a content of the first solid lubricant in a range from 40.0 vol % to 50.0 vol %, inclusive, of an entirety of the plated slide layer,
    the intermediate plated layer having a thickness of 1 μm to 5 μm and containing a second solid lubricant and at least one metal selected from the group consisting of nickel, copper, tin and zinc,
    a content in vol % of the second solid lubricant in the intermediate plated layer being less than the content of the first solid lubricant in the plated slide layer and less than or equal to 30 vol % of an entirety of the intermediate plated layer,
    the plated slide layer being an outermost layer of the slide member and having a substantially uniform dispersion of the first solid lubricant throughout an entirety of the plated slide layer,
    the intermediate plated layer being in direct physical contact with the base material,
    the base material consisting of at least one selected from the group consisting of: iron, stainless steel, aluminum, titanium, copper, brass, and alloys thereof, and
    a total thickness of the plated slide layer and the intermediate plated layer ranging from 2 μm to 20 μm.

2. The slide member according to claim 1, wherein the base material includes at least one metal selected from the group consisting of iron, stainless steel, aluminum and titanium.

3. The slide member according to claim 1, wherein the plated slide layer contains at least one metal selected from the group consisting of nickel, copper, tin and zinc.

4. The slide member according to claim 1, wherein the plated slide layer and the intermediate plated layer contain a metal of the same type selected from the group consisting of nickel, copper, tin and zinc.

5. The slide member according to claim 1, wherein the first solid lubricant contains particles of a fluorine compound.

6. The slide member according to claim 5, wherein the fluorine compound is at least one selected from the group consisting of polytetrafluoroethylene, tetrafluoroethylene-hexafluoropropylene copolymer, tetrafluoroethylene-perfluoroalkyl vinyl ether copolymer, polychlorotrifluoroethylene and tetrafluoroethylene-ethylene copolymer.

7. The slide member according to claim 1, wherein the first solid lubricant contains particles of at least one selected from the group consisting of boron nitride, molybdenum disulfide, polytetrafluoroethylene, tetrafluoroethylene-hexafluoropropylene copolymer, tetrafluoroethylene-perfluoroalkyl vinyl ether copolymer, polychlorotrifluoroethylene and tetrafluoroethylene-ethylene copolymer.

8. The slide member according to claim 1, wherein the plated slide layer and the intermediate plated layer are electroplated layers.

9. The slide member according to claim 1, wherein the thickness of the intermediate plated layer is 50% or less of the thickness of the plated slide layer.

10. A bicycle component including the slide member according to claim 1.

11. The bicycle component according to claim 10, wherein the bicycle component is a front sprocket.

12. The bicycle component according to claim 10 wherein the bicycle component is a rear sprocket.

13. The bicycle component according to claim 10, wherein the bicycle component is a chain.

14. A fishing tackle component for use in fishing tackle, the fishing tackle component including the slide member according to claim 1.

* * * * *